Figure 1:
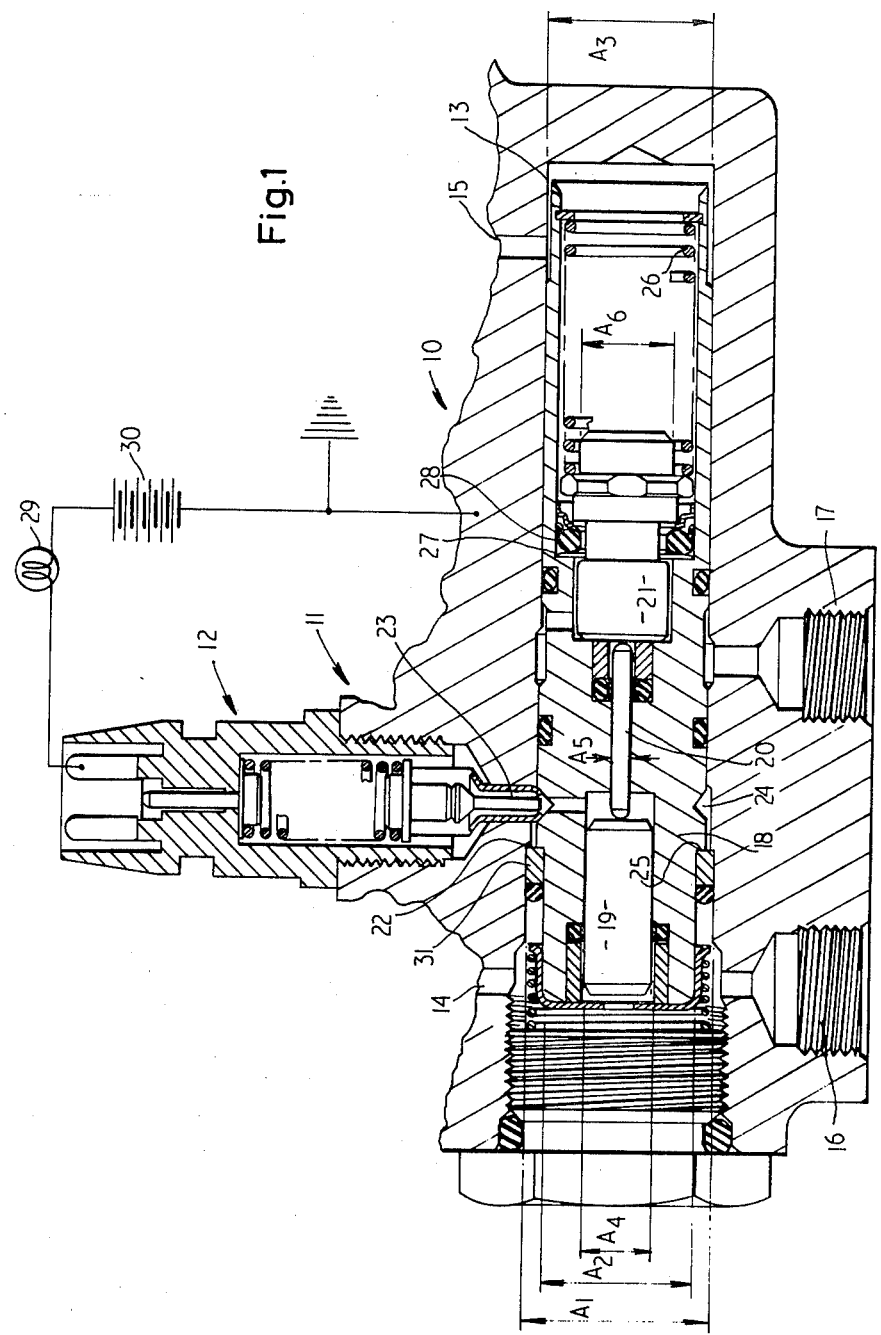

United States Patent [19]

Sawyer

[11] 4,269,453

[45] May 26, 1981

[54] BRAKE PRESSURE CONTROL VALVES

[75] Inventor: Patrick F. Sawyer, Prestons, Australia

[73] Assignee: Girlock Limited, New South Wales, Australia

[21] Appl. No.: 43,629

[22] Filed: May 30, 1979

[30] Foreign Application Priority Data

Jun. 8, 1978 [AU] Australia .............................. PD4649

[51] Int. Cl.³ .............................................. B60T 8/26
[52] U.S. Cl. ................................................. 303/6 C
[58] Field of Search .................... 303/6 C, 6 R, 84 A, 303/84 R

[56] References Cited

U.S. PATENT DOCUMENTS

| 3,967,082 | 6/1976 | Remy | 303/6 C X |
|---|---|---|---|
| 4,053,186 | 10/1977 | Jakobi | 303/6 C |
| 4,174,867 | 11/1979 | Oberthur | 303/6 C |

Primary Examiner—Duane A. Reger
Attorney, Agent, or Firm—Irvin A. Lavine

[57] ABSTRACT

A brake pressure control valve consisting in a combined pressure differential warning actuator (PDWA) and pressure conscious reducing valve (PCRV) in which the PDWA consists of a piston exposed at each end to fluid pressure of one brake system acting in combination with an electric switch in such a manner that if the differential pressure between the ends exceeds a certain value the piston is moved to operate the switch and give a warning and in which the PCRV consists of a piston or a number of pistons arranged within the PDWA piston to provide for control of the fluid pressure supplied to rear brakes of a vehicle to assist in preventing locking up, such control not being exercised in the event that there is a failure of the front brake system of the vehicle.

4 Claims, 2 Drawing Figures

BRAKE PRESSURE CONTROL VALVES

The present invention relates to brake pressure control valves for use in the hydraulic braking systems of motor vehicles and more particularly for use in hydraulic braking systems known as dual or tandem braking systems in which, usually, two separate master cylinders are arranged in tandem one operating the brakes of the front wheels and the other operating the brakes of the rear wheels, such an arrangement being adopted to ensure that if a failure occurs in the part of the circuit associated with the brakes for the front wheels braking is still available for the brakes associated with the rear wheels and vice versa.

In such systems it is well known to provide what is known as a pressure differential warning actuator (hereinafter referred to as PDWA) which acts to give a visible or audible warning if the fluid pressure in one braking system differs significantly from that in the other, due to a leakage of fluid in one system. It is also well known to provide what is known as a pressure conscious reducing valve (hereinafter referred to as PCRV). This acts to reduce the pressure applied to the brakes acting on the rear wheels thus reducing the proportion of the braking effort exercised by the rear brakes with a view to preventing lock up of the rear wheels.

The object of the present invention is to provide a single device combining the functions of both a PDWA and PCRV which when constructed in preferred forms has advantages of compactness and reduced machining. Preferred forms of the invention also have other advantages set out in detail below in connection with a description of one preferred embodiment of the invention.

The present invention consists in a combined PDWA and PCRV for a fluid pressure operated dual braking system consisting of a housing, a bore passing through said housing, first piston means axially movable in the bore, a first fluid pressure inlet to said bore, a second fluid pressure inlet to said bore, a first fluid outlet from said bore for connection to an actuator for a first set of brakes, a second fluid outlet from said bore for connection to an actuator for a second set of brakes, electric switch means actuable by movement of said first piston means caused by a fluid pressure differential between said inlets, second piston means contained within said first piston means and axially moveable in relation thereto, a spring controlling the movement of said second piston means, valve means arranged within said first piston means, said valve means being opened and closed by movement of said second piston means in response to fluid pressure induced force differentials across said second piston means whereby fluid pressure at said second fluid outlet is controlled.

Figure 2:
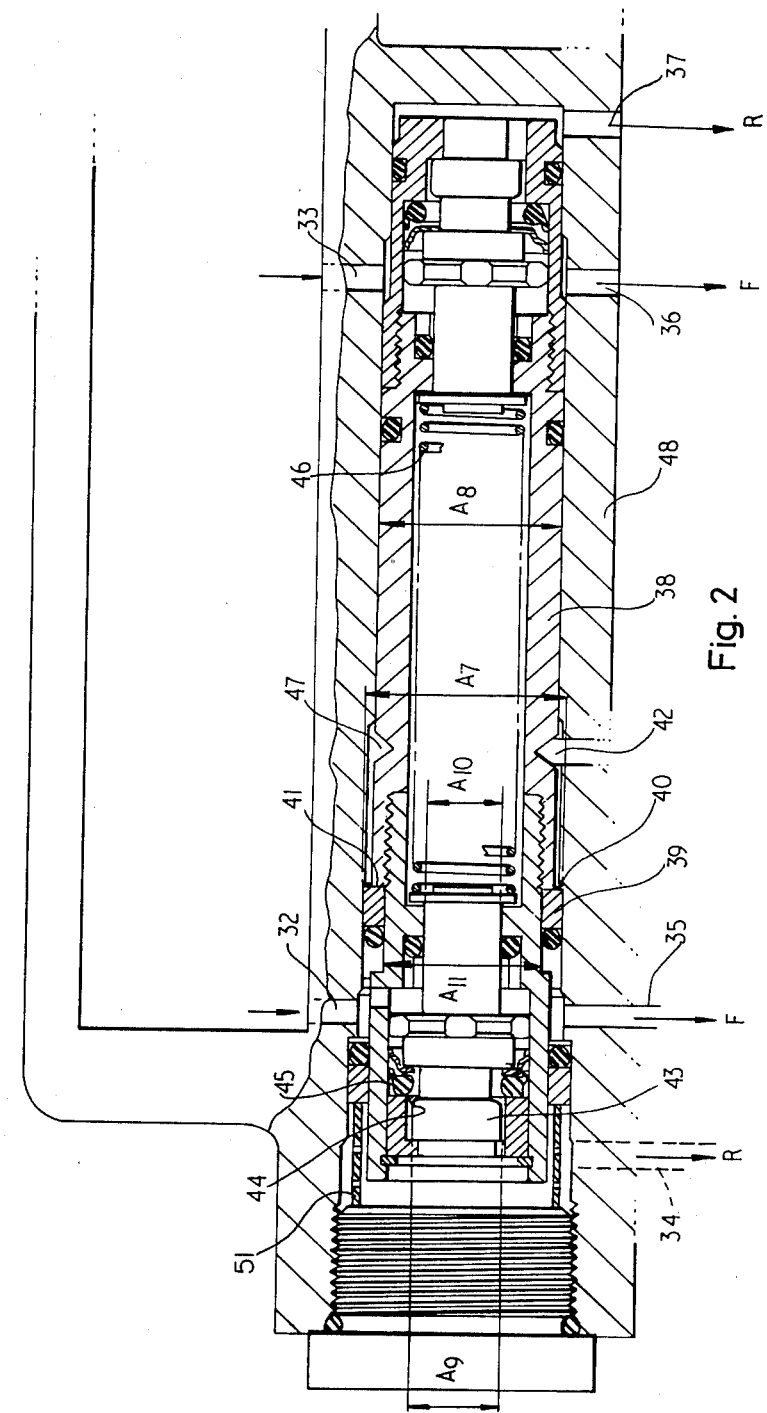

In order that the nature of the invention may be better understood a preferred form thereof is hereinafter described by way of example with reference to the accompanying drawings in which:

FIG. 1 is a transverse cross section through a first preferred form of construction according to the invention; and FIG. 2 is a similar view of a second preferred form of construction according to the invention.

The preferred form of the invention illustrated in FIG. 1 consists in a housing 10 which may conveniently be made as part of a tandem master cylinder assembly. A boss 11 of the housing 10 carries an electrical switch assembly 12 the function of which is described below.

A bore 13 extends through the housing 10 the bore being connected to a first master cylinder through the inlet 14 and to a second separate master cylinder through the inlet 15. In the housing 10 there is provided a first fluid outlet 16 from the bore 13 intended to be connected to the actuators of the front brakes of a vehicle and a second outlet 17 intended for connection to the actuators of the rear wheel brakes of a vehicle. Within the bore 13 and axially slidable in it is a piston 18 which constitutes the first piston means. Mounted within the piston and axially slidable in it are three pistons 19, 20 and 21 which constitute between them the second piston means. The remainder of the structure will be understood by the following description of the manner in which the various parts function.

The PDWA is of automatic reset design and functions as follows:

When pressure is applied to both systems simultaneously the pressure in the front brakes acts on area A1 and pressure in the rear brakes on area A3. Area A1 is larger than A3 therefore sleeve 31 is held against shoulder 22 in housing 10 i.e. spring loaded switch probe 23 stays in 'V' groove 24 of piston 18 and no signal is given as the sides of the probe 23, in contrast to its tip, are covered with insulating material and this in turn is coaxial with a steel shroud which bears against the piston 18. It is to be noted that in order to accommodate the PCRV a large diameter piston 18 is used for the PDWA and this unit is restrained from movement until a pressure differential of about 60 lbs/sq. inch exists across it. The spring of the switch probe 23 must be sufficiently strong to hold the probe in the 'V' groove 24. This leads to a high force being applied to the tip of the probe by the piston when it starts to move and it is to resist this that a steel shroud is provided around the insulating material of the probe.

When front brake failure occurs, rear brake pressure acts on area A3 to push piston 18 to the left such that the probe 23 rises to the top of 'V' groove 24 so that the tip of the probe makes contact with piston 18 and gives a signal by completing an electrical circuit. This movement also takes sleeve 31 away from shoulder 22.

When front brake pressure is restored, pressure will act on areas A1 and A3 simultaneously. Area A1 being bigger than A3, the piston will move to the right until sleeve 31 comes into contact with shoulder 22.

When rear brake failure occurs, front brake pressure acts on area A2 to move piston 18 to the right so that probe 23 rises to the top of 'V' groove 24 and makes contact with piston 18. Hence giving a signal by making an electrical circuit. This movement also takes shoulder 25 away from sleeve 31.

When rear brake pressure is restored, pressure will act on area A2 and A3 simultaneously. Area A3 being bigger than A2, the piston will move to the left until shoulder 25 comes into contact with sleeve 31.

The PCRV with bypass functions as follows:

When pressure is applied to both systems simultaneously pressure acts on area A4 to the right and A5 to the left. A5 is small compared to A4, so as pressure is increased, at a particular pressure (known as the cut in point) spring 26 will be overcome such that pistons 19, 20 and 21 will move to the right so that shoulder 27 on piston 21 comes into contact with metering seal 28. Any further increase in pressure will now cause pressure to act on area A6 to the left and A4 to the right. A6 being greater than A4 the piston 19, 20 and 21 will move to the left to take shoulder 27 off seal 28 to allow fluid to pass across seal 28. This increase in pressure will now act on area A6 to the right to bring shoulder 27 back into contact with seal 28. The process continues as the inlet pressure is increased giving reduced pressure on the brake rear outlet side.

On reduction of inlet pressure the pistons 19, 20 and 21 will stroke to the right, as the forces acting to the right due to areas A4 and A6 are greater than forces to the left due to area A6 and spring 26. This will cause the rear brake pressure to be reduced.

In the event of a front brake failure, no pressure will act on area A4 and hence there will be no forces to push pistons 19, 20 and 21 to the right and therefore no rear brake pressure reduction will occur. Since no parts are expected to function in a different manner from the full system condition, there are no redundant members.

Associated with the switch 12 is a warning lamp 29 and vehicle battery 30, the warning lamp 29 being mounted in a position so that it is clearly visible to the driver of vehicle who will know, if the lamp illuminates, that there is a defect in the front or rear braking system giving rise to an imbalance in pressure across the piston 18 causing it to move in the housing 10 and that steps should be taken to investigate the situation.

While the PDWA and the switch mechanism function in a known manner as does the PCRV the advantages of the invention arise from the manner in which these are combined so that the PCRV and bypass are in fact contained within the PDWA piston. In the form of the invention described this results in compactness and reduced machining. The same housing can be used for valves having different ratios and other characteristics. A further particular advantage arises from the fact that the PDWA piston 18 can be inserted into and removed from the housing as a complete unit and the functioning of the PCRV can be tested separately under fluid pressure. The other units in the housing require only air testing and thus after separate fluid testing of the valve it can be assembled in the housing and the whole assembly tested by the application of air under pressure.

FIG. 2 shows a twin PCRV and PDWA unit for controlling the operation of separate braking systems on a vehicle, instead of operating both front brakes from one system and both rear brakes from the other system, each system operates either one front and the opposite rear brake, or one half of each front brake and one rear brake. In this construction the fluid outlets, the valves and the second piston means are duplicated while a single spring is used otherwise the principles of operation are the same as the embodiment described above and for this reason the manner of operation will be described briefly.

The PDWA is of automatic reset design and functions as follows:

When pressure is applied to both systems simultaneously the pressure in the left brakes act on area A7 and pressure in the right brakes on area A8. Area A7 is larger then A8 therefore sleeve 39 is held against shoulder 40 in housing 48, i.e. switch probe 42 stays in 'V' groove 47 of piston 38 and no signal is given as the sides of the probe 42 in contrast to its tip, are covered with insulating material which bears against the piston 38.

When left brake failure occurs, right brake pressure acts on area A8 to push piston 38 to the left such that the probe 42 rises to the top of 'V' groove 47 so that the tip of the probe makes contact with piston 38 and gives a signal by completing an electrical circuit. This movement also takes sleeve 39 away from shoulder 40.

When left brake pressure is restored, pressure will act on areas A7 and A8 simultaneously. Area A7 being bigger than A8, the piston will move to the right until sleeve 39 comes into contact with shoulder 40.

When right brake failure occurs, left brake pressure acts on area A11 to move piston 38 to the right so that probe 42 rises to the top of 'V' groove 47 and makes contact with piston 38. Hence giving a signal by making an electrical circuit. This movement also takes shoulder 41 away from sleeve 39.

When right brake pressure is restored, pressure will act on area A11 and A8 simultaneously. Area A8 being bigger than A11, the piston will move to the left until shoulder 41 comes into contact with sleeve 39.

The two valves function as follows:

1. LEFT VALVE

When pressure is applied through inlet 32 full pressure passes to outlet 35 to the right front brake and fluid flows through the valve to outlet 34, to the right rear brake.

Pressure acts on area A10 to the right. At a particular pressure (known as the cut in point) spring 46 will be overcome and piston 43 will move to the right so that shoulder 44 on piston 43 comes into contact with seal 45. Any further increase in pressure will now cause pressure to act on area A9–A11 to the left to take shoulder 44 off seal 45 to allow fluid to pass though the seal. This increase in pressure will now act on area A9 to the left to bring shoulder 27 back into contact with seal 45. The process continues as the inlet pressure is increased giving reduced pressure; through a perforated cylinder 51 to outlet 34, leading to the left rear brake.

2. RIGHT VALVE

Functions as the left valve but now 33 is the inlet, 36 the non-reduced outlet and 37 the reduced pressure outlet, leading to the left rear brake.

It is to be noted that spring 46 controls the cut in of both valves so that the cut in of the valves will be substantially the same.

The embodiments of the invention described above are given by way of example only as constituting preferred forms of the invention within the broad scope thereof as defined in the succeeding claims.

I claim:

1. A combined pressure differential warning actuator and pressure conscious reducing valve for a fluid pressure operated dual braking system comprising a housing, a bore in said housing, first piston means axially movable in the bore, a first fluid pressure inlet to said bore, a second fluid pressure inlet to said bore, a first fluid outlet from said bore for connection to an actuator for a first set of brakes, a second fluid outlet from said bore for connection to an actuator for a second set of brakes, electric switch means actuable by movement of said first piston means caused by a fluid pressure differential between said inlets, valve means arranged within said first piston means for controlling flow between said second fluid inlet and said second fluid outlet to reduce pressure to said second outlet, said second fluid outlet being the only fluid outlet from said housing in fluid communication with said second fluid inlet, second piston means subject to pressure of said first and second inlets and including a spring, said second piston means contained within said first piston means and axially movable in relation thereto for opening and closing said valve means in response to fluid pressure induced force differentials there across, whereby fluid pressure at said second fluid outlet is controlled.

2. A combined pressure differential warning actuator and pressure conscious reducing valve for a fluid pressure operated dual braking system comprising a housing, a bore in said housing, first piston means axially movable in the bore, a first fluid pressure inlet to said bore, a second fluid pressure inlet to said bore, a first fluid outlet from said bore for connection to an actuator for a first set of brakes, a second fluid outlet from said bore for connection to an actuator for a second set of brakes, electric switch means actuable by movement of said first piston means caused by a fluid pressure differential between said inlets, valve means arranged within said first piston means for controlling flow between said second fluid inlet and said second fluid outlet to reduce pressure to said second outlet, second piston means subject to pressure of said first and second inlets and including a spring, said second piston means contained within said first piston means and axially movable in relation thereto for opening and closing said valve means in response to fluid pressure induced force differentials there across, whereby fluid pressure at said second fluid outlet is controlled, said second fluid outlet being part of means for providing a single flow path from said bore to the second set of brakes.

3. A combined pressure differential warning actuator and pressure conscious reducing valve as claimed in claim 1 wherein said first and second fluid outlets, said second piston means and said valve means are duplicated and said spring acts on both second piston means, whereby fluid pressure at both said second fluid outlets is controlled separately according to the pressure existing at the corresponding first fluid outlet.

4. A combined pressure differential warning actuator and pressure conscious reducing valve as claimed in claim 1 or claim 3 wherein the housing is formed integrally with the housing of a tandem master cylinder assembly.

* * * * *